United States Patent [19]

Berger

[11] Patent Number: 5,100,290

[45] Date of Patent: Mar. 31, 1992

[54] TURBINE GENERATOR FOR USE IN AXIAL WATER FLOW

[75] Inventor: Günter Berger, Recklinghausen, Fed. Rep. of Germany

[73] Assignee: Mannesmann Aktiengesellschaft, Düsseldorf, Fed. Rep. of Germany

[21] Appl. No.: 486,105

[22] Filed: Feb. 28, 1990

[30] Foreign Application Priority Data

Feb. 28, 1989 [DE] Fed. Rep. of Germany ....... 3906698

[51] Int. Cl.[5] .............................................. F03B 11/00
[52] U.S. Cl. ...................................... 415/60; 415/107; 415/122.1; 415/216.1
[58] Field of Search ................ 415/60, 61, 104, 107, 415/122.1, 124.1, 170.1, 229, 216.1; 290/43, 52, 54

[56] References Cited

U.S. PATENT DOCUMENTS

| | | | |
|---|---|---|---|
| 2,986,646 | 5/1961 | Ding | 290/52 |
| 3,038,307 | 6/1962 | Oprecht | 415/60 |
| 3,632,222 | 1/1972 | Cronstedt | 415/122.1 |
| 4,137,005 | 1/1979 | Comstock | 415/122.1 |
| 4,274,009 | 6/1981 | Parker, Sr. | 290/54 |

FOREIGN PATENT DOCUMENTS 53096 3/1989 Japan ..................... 415/104
1280178 12/1986 U.S.S.R. ..................... 290/52

OTHER PUBLICATIONS

Dubbels Taschenbuch für den Maschinenbau, 1966, p. 567.

*Primary Examiner*—Edward K. Look
*Assistant Examiner*—James A. Larson
*Attorney, Agent, or Firm*—Cohen, Pontani & Lieberman

[57] ABSTRACT

A Kaplan turbine is provided. The Kaplan turbine includes a turbine shaft having a solid shaft and turbine blades on one end thereof. The turbine shaft has an end distal from the turbine blades which distal end includes a hollow shaft, a portion of the hollow shaft being developed as a cage. A drive shaft is connected on one end to a generator. The other end of the drive shaft extends within the hollow shaft and into the cage. The cage includes a gear assembly for transmitting rotational force from the turbine shaft to the drive shaft. A housing surrounds the cage and the gear assembly. The housing can be mounted on a foundation. The Kaplan turbine has thrust bearings mounted within the housing at interfaces between the cage and the housing. The Kaplan turbine also has radial bearings mounted in the housing at interfaces between the solid shaft and the housing and between the hollow shaft and the housing, respectively.

15 Claims, 1 Drawing Sheet

TURBINE GENERATOR FOR USE IN AXIAL WATER FLOW

FIELD OF THE INVENTION

The present invention relates to a Kaplan turbine with axial water flow, having a turbine shaft which is connected via a gear assembly to a drive shaft and which has radial and thrust bearings resting in a housing which surrounds one end of the turbine shaft, and which has a generator which is driven by the drive shaft.

BACKGROUND OF THE INVENTION

A Kaplan turbine is a device for extracting kinetic energy from a flowing stream of water and converting same into electric power. In such a device a driven member (e.g. a set of turbine blades) is arranged in the flowing stream. Some of the kinetic energy in this stream is converted into rotation of the driven member, which, in turn, causes rotation of a turbine shaft. This rotational energy is then transferred via a suitable transmission to the drive shaft of a generator, thereby generating electricity.

In order to obtain a higher yield from water power, Kaplan turbines have become of increasingly larger construction. In this way, the forces acting on the individual parts have also increased. Thus, Kaplan turbines can achieve outputs of more than 3000 kW, in which case the turbine blades may have a diameter of more than 3 meters.

Tensile and compressive forces, as well as bending moments, can be introduced by the turbine blades into the turbine shaft. These forces and moments are taken up by thrust and radial bearings and introduced into the foundation via the housing.

A poster of Voest-Alpine (PITTYPE TURBINE), describes a Kaplan turbine in which the turbine blades, turbine shaft, gear assembly (transmission), drive shaft and generator are arranged in a line. The tensile and compressive forces introduced by the turbine blades are taken up by a pressure collar which is arranged on the turbine shaft. The turbine shaft is mounted on a radial bearing so that the gear assembly which is arranged in line with the turbine shaft requires at least one additional radial bearing.

Difficulties in manufacture are encountered in connection with the pressure collar upon the machining of the pressure-bearing surfaces, particularly in connection with the final shaping since it is not possible, for instance, to grind this in one chucking. These difficulties which occur upon new manufacture are even greater in the case of possible repair work on an installed turbine.

The housing which is to be brought into the water flowing around it has a large volume in radial and axial directions since it must completely surround parts which are arranged in a line.

It is, therefore, an object of the invention to create a Kaplan turbine which poses the least possible resistance to the flow of water and assures, by means of a smaller number of bearing elements which can be easily machined from a manufacturing standpoint, a dependable fastening of the turbine shaft and the gear assembly.

SUMMARY OF THE INVENTION

A Kaplan turbine in accordance with the invention includes a turbine shaft having a solid shaft and turbine blades on one end thereof. The turbine shaft has an end distal from the turbine blades which distal end includes a hollow shaft, a portion of the hollow shaft being developed as a cage. A drive shaft is connected on one end to a generator. The other end of the drive shaft extends within the hollow shaft and into the cage. The cage includes a gear assembly for transmitting rotational force from the turbine shaft to the drive shaft. A housing surrounds the cage and the gear assembly. The housing can be mounted on a foundation. The Kaplan turbine of the invention has thrust bearings mounted within the housing at interfaces between the cage and the housing. The Kaplan turbine of the invention also has radial bearings mounted in the housing at interfaces between the solid shaft and the housing and between the hollow shaft and the housing, respectively.

Preferably, the gear assembly has a planetary arrangement and includes a driven gear and a satellite gear which meshes with the driven gear, on the one hand, and with teeth located around the inner circumference of the housing which surrounds the cage, on the other hand.

The use of a planetary gear assembly arranged in the turbine shaft provides a Kaplan turbine which as a whole is compact and of short structural length with favorable hydrodynamic properties.

DESCRIPTION OF THE PREFERRED EMBODIMENT

Figure 1:
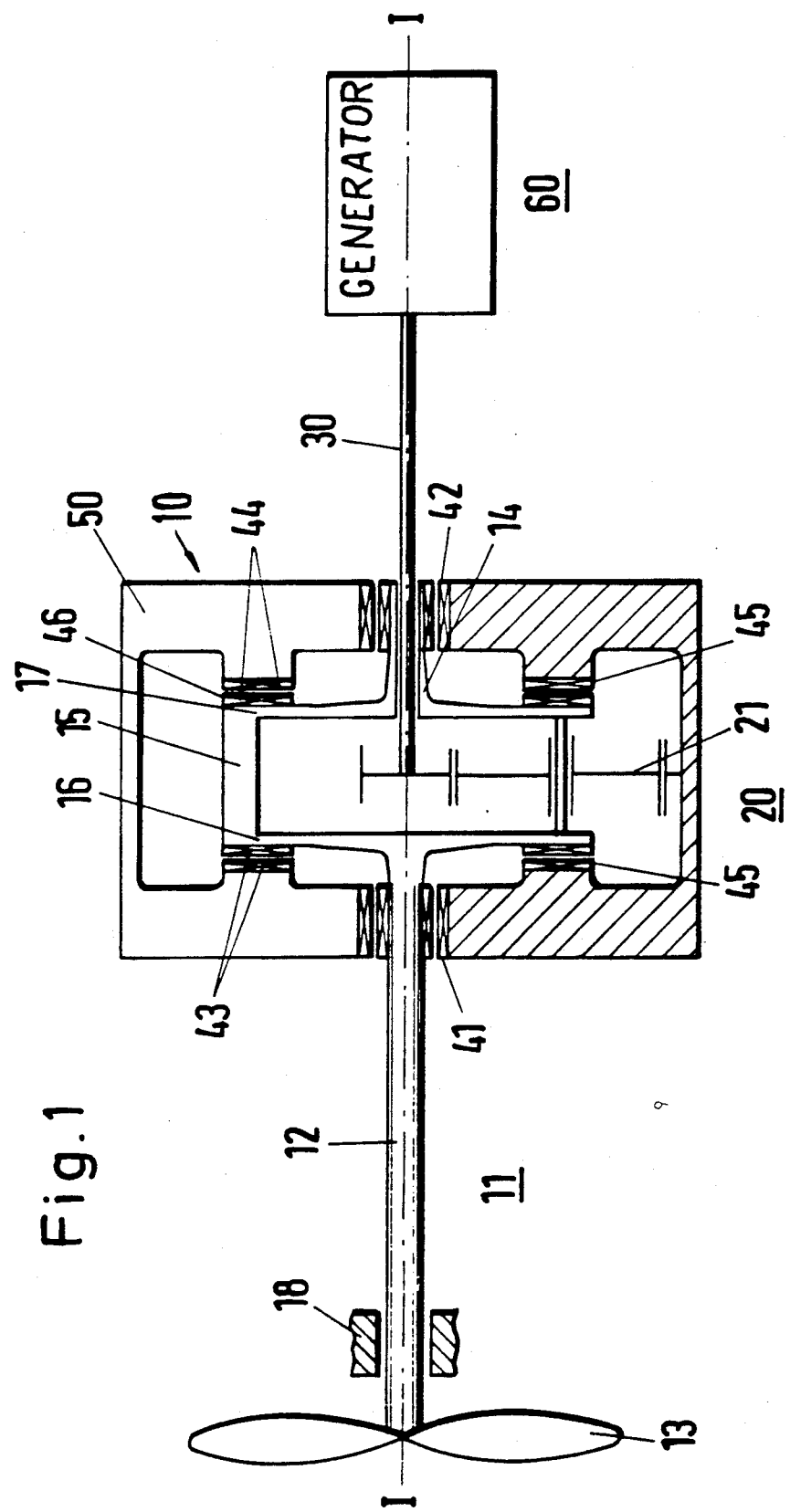
FIG. 1, shows a side view of a Kaplan turbine in accordance with the invention, partly in cross-section.

FIG. 1 shows a generator 60 which is driven by a turbine 10 via a turbine shaft 11 and a drive shaft 30, a gear assembly 20 being arranged between the shafts 11 and 30.

Turbine blades 13 are fastened to the turbine shaft 11. The part of the turbine shaft 11 which is proximal to the turbine blades 13 is developed as a solid shaft 12 while the end which is distal therefrom is developed as a hollow shaft 14, a part of the hollow shaft 14 being further developed as a cage 15. The cage 15 surrounds the gears 21 and, together with them, forms the gear assembly 20 which is all surrounded by a housing 50. The gear assembly 20, is preferably, a planetary gear system.

The turbine shaft 11 is mounted radially on a bearing 18, which is arranged in the vicinity of the turbine blades 13, and on radial bearings 41 and 42 which are provided in the housing 50. The drive shaft 30 is connected in axially and angularly moveable manner to the gear assembly.

Also present in the housing 50 are thrust bearings 43, 44 which are perpendicular to the shaft 12 of the turbine shaft 11 and, for reasons of easy repair, are formed of annular flanges 45, 46 which are detachably fastened to the housing and the cage, respectively.

The Kaplan turbine in accordance with the invention needs only the three radial bearings 18, 41 and 42 for the supporting of the turbine shaft 11 and the gear assembly 20. Two of these radial bearings, 41 and 42 are preferably developed as sliding bearings and are arranged one in each end of the turbine shaft 11 and thus spaced far apart from each other. In this way, the radial forces acting on the turbine shaft 11 are taken up in optimal fashion, particularly as one of the radial bearings 41 is arranged in the immediate vicinity of the place of introduction of the force and the other 42 is provided at a far distance behind the cage 15 from the generator side which is structurally feasible. Thrust bearings 43, 44 may also be formed as sliding bearings.

The thrust bearings 43 and 44 are arranged on annular surfaces 16 and 17, respectively, on the outer side of the cage 15 which surrounds the gear assembly 20. The thrust bearings 43 and 44 thus also are a wide distance apart and their diameter of action is considerably increased as compared with a pressure-collar on the shaft, as a result of which the specific loading on the gearing blocks is reduced. Furthermore, the element which bears the bearing, in this case the cage 15, can be made relatively stiff by simple means. At the same time, as a result of this arrangement of the thrust bearings 43 and 44, no separate space is required to take up the axial forces so that, in turn, a positive influence is obtained on the turbine shaft 11 with regard to its length. Due to the development of the turbine shaft 11 in part as a hollow shaft 14, it and the driven shaft 30 can be inserted one within the other, as a result of which further structural space is saved.

The ratio of the center-to-center distance A between the radial bearings 41 and 42 to the center-to-center distance B between the thrust bearings 43 and 44 is preferably selected in an amount of (1.5-2.5):1. The total stresses in the turbine shaft 11, which are formed of the flexural and tensile and compressive stresses, are thereby limited to a minimum. In this way it becomes possible to make the turbine shaft 11 as light as possible. The individual elements are thereby developed in an advantageous manner. Advantageously, a portion of the turbine shaft 11 is developed as a transition 22 from the solid shaft 12 to the cage 15 and another portion of the turbine shaft is developed as a transition 19 from the cage 15 to the hollow shaft 14. The transitions 19 and 22 each have a cross-sectional thickness which is proportional to the course of the stresses moving outwards from the axis of the turbine shaft 11 to the circumference of the cage 15. The transitions 19 and 22 are collectively referred to below as "the web". In the present invention, the thrust bearings 43 and 44 taken together in combination with the housing 50 act as a pressure collar on the web cheeks (i.e., annular surfaces 16, 17) of the cage 15 which is itself developed as a satellite gear carrier. In this manner, tensile and compressive forces are introduced from the turbine shaft 11 to the web. The flexural moments and transverse forces occurring due to these tensile and compressive forces, as well as deformations in the web cheeks, must therefore be taken into consideration. The moments acting in the radial or tangential portion of the web increase toward the solid shaft 12 or hollow shaft 14 as the case may be and decrease as one moves away from the axis thereof. In accordance with the invention, constant stresses are advantageously achieved in connection with the cross sections of the web cheeks by adaptation of the moment of resistance of the web cheeks to the variable course of the moments. For this, the ratio of the prevailing moment to the moment of resistance is kept approximately constant and superimposed on the dimensioning in strength of the satellite gear carrier (i.e., the cage 15). In this manner, calculations which generally would require lengthy calculation time in accordance with the finite-elements method are avoided. With this adjusted course of the contours, there is achieved a wall thickness which is as slight as possible and which, fully utilizing the properties of the material, reduces the weight of the turbine as a whole.

By way of example, in the embodiment illustrated in FIG. 1, the prevailing moment acting on the solid shaft 12 is generally equal and opposite to the moment of resistance acting on the cage 15. At constant rotational speed accelerative forces may be ignored and the moment of resistance is thus equal to the sum of the frictional force induced in the thrust bearings 43 and 44 plus the tangential force acting on the axis of the satellite gear, said sum being multiplied by the distance from the axis of the solid shaft 12 to the point of application of the aforesaid frictional and tangential forces on the cage 15. As shown in FIG. 1, the axis of the satellite gear substantially coincides with the location of the thrust bearings 43 and 44 about the periphery of the cage 15. This arrangement provides an advantageous distribution of shear forces (in the rotational direction). When the tangential and frictional forces coincide near the periphery of the cage 15, the shear forces acting in the rotational direction on the transitions 19 and 22 will vary in substantially inverse proportional relation to the distance from the axis of rotation of the turbine shaft 11. By varying the cross-section of the transitions 19 and 22 in like manner (i.e. higher towards the axis of the turbine shaft and lower towards the periphery of the cage) relatively constant stress (shear force/cross-sectional area) is achieved. This varying cross-section (i.e. the adjusted course of the contours) enables the cage to be lighter in weight. Moreover, the distribution of shear forces, which is provided by arranging the axis of the satellite gear in close proximity to the thrust bearings 43 and 44, is thus made relatively uncomplicated. This in turn makes the Kaplan turbine according to the invention easier to manufacture in addition to being lighter in weight and more compact.

A further advantage consists of the feasibility of replacing the pressure surface for the generator-side thrust bearing 44. This bearing is, as a whole, subjected to higher load and therefore more strongly endangered by wear. As a result of the possibility of replacement, the difficulty in chucking upon the machining of the pressure surface during the new manufacturing phase is dispensed with. However, the repair of worn or damaged pressure bearings is made particularly simple. They can, in advantageous fashion, be repaired on the spot without removal of the turbine shaft. To construct the bearings a material of high resistance to wear should be used, for example LgPbSn9Cd (Dubbels Tachenbuch für den Maschinenbau 1966, page 567, Table 48) and the like.

While there have been shown and described and pointed out fundamental novel features of the invention as applied to a currently preferred embodiment thereof, it will be understood that various omissions and substitutions and changes in the form and details of the device illustrated, and in its operation, may be made by those skilled in the art without departing from the spirit of the invention. It is the intention, therefore, to be limited only as indicated by the scope of the claims appended hereto.

What is claimed is:

1. A Kaplan turbine for use in axial water flow, comprising:

a) a turbine shaft having a solid shaft and a driven member on one end thereof, the turbine shaft having an end distal from the driven member, which distal end includes a hollow shaft, a portion of the hollow shaft being formed as a cage;

b) a drive shaft, a portion of which extends within the hollow shaft and into the cage;

c) gear assembly means for transmitting rotational force from the turbine shaft to the drive shaft, part of the gear assembly means being located within the cage;

d) a housing for mounting the Kaplan turbine to a foundation, the housing surrounding the cage and the gear assembly means;

e) thrust bearings mounted within the housing at interfaces between the cage and the housing;

f) radial bearings mounted within the housing at interfaces between the solid shaft and the housing and between the hollow shaft and the housing, respectively; and g) a generator which is connected to the drive shaft.

2. The Kaplan turbine according to claim 1, wherein the cage has one end which is solid part of the turbine shaft and a second end which is distal to the solid part of the turbine shaft, each end including an annular surface for receiving the thrust bearings.

3. The Kaplan turbine according to claim 2, wherein the proximal end of the cage includes a first transition portion from the turbine shaft to the cage and wherein the distal end of the cage includes a second transition portion from the hollow shaft to the cage, the transition portions each having a cross-section which is varied in proportion to the stresses acting thereon during operation of said Kaplan turbine.

4. The Kaplan turbine according to claim 3, wherein the cross-sections of the transition portions are gradually reduced in proportion to the stresses from a larger cross-section near the axis of the turbine shaft to a thinner cross-section near the outer periphery of the cage.

5. The Kaplan turbine according to claim 4, wherein the cross-sections of the transition portions are varied to provide substantially constant stress in the transition portions regardless of the radial distance outward from the axis of the turbine shaft.

6. The Kaplan turbine of claim 5, wherein the gear assembly means comprises a driven gear attached to the drive shaft of the generator, gear teeth extending around the inner periphery of the housing and a satellite gear which meshes with the driven gear and the gear teeth, the satellite gear being rotationally mounted on the cage.

7. The Kaplan turbine of claim 6, wherein the satellite gear is rotationally mounted on the cage at a distance from the axis of the turbine shaft which is substantially equal to the distance of the thrust bearings from the turbine shaft.

8. The Kaplan turbine according to claim 2, wherein the thrust bearings are arranged, in the axial direction, between the radial bearings which support the turbine shaft in the housing.

9. The Kaplan turbine according to claim 8, wherein the ratio of the center-to-center distance between the radial bearings to the center-to-center distance between the thrust bearings is equal to (1.5-2.5):1.

10. The Kaplan turbine according to claim 9, wherein the radial and thrust bearings are sliding bearings.

11. A Kaplan turbine according to claim 10, wherein each of the thrust bearings comprises two annular surface flanges that are arranged on the housing and on the cage, respectively.

12. The Kaplan turbine according to claim 11, wherein the flanges are detachably fastened to the housing and on the cage, respectively.

13. The Kaplan turbine according to claim 11, wherein the flanges are made out of LgPbSn9Cd.

14. The Kaplan turbine according to claim 1, wherein a portion of the drive shaft which is distal from the generator is rotatably supported in the hollow shaft and is connected in axially and angularly moveable manner to the gear assembly means.

15. The Kaplan turbine according to claim 14, wherein the gear assembly means is a planetary gear system.

* * * * *